United States Patent

[11] 3,605,093

[72] Inventors John Ronald Parks;
Charles Howard Davis; Gerald Owen Plumb, all of Teddington, Middlesex, England

[21] Appl. No. 836,425
[22] Filed June 25, 1969
[45] Patented Sept. 14, 1971
[73] Assignee National Research Development Corporation
[32] Priority June 25, 1968
[33] Great Britain
[31] 30,306/68

[54] SYSTEMS AND APPARATUS FOR CHARACTER RECOGNITION
20 Claims, 19 Drawing Figs.

[52] U.S. Cl. ....................................................... 340/146.3 J
[51] Int. Cl. ....................................................... G06k 9/00
[50] Field of Search ............................................. 340/146.3

[56] References Cited

UNITED STATES PATENTS

| | | | |
|---|---|---|---|
| 3,430,198 | 2/1969 | Gattner et al. | 340/146.3 |
| 3,519,991 | 7/1970 | Kobayashi | 340/146.3 |
| 3,289,161 | 11/1966 | Gattner et al. | 340/146.3 |
| 3,305,835 | 2/1967 | Beltz | 340/146.3 |

*Primary Examiner*—Thomas A. Robinson
*Attorney*—Cushman, Darby & Cushman

ABSTRACT: System and apparatus for recognizing both handwritten and machine-printed character patterns in which the character filed is scanned by photoelectric means to generate an analog-form signal which is converted into a four-bit binary form and fed to a four-bit parallel shift register from which differently delayed versions are taken to summing circuits in the development of *n*-tuples which operate to detect the presence of short line segments of specific orientation within the character area. By means of further summing circuits the line segment responses are analyzed to identify and indicate the position of a number of different topographical features such as line endings, bends or corners, line junctions and line crossings. These feature responses are converted into a list of code signals for matching, as by computer, with standard lists of similar code signals derived from ranges of different standard characters.

SYSTEMS AND APPARATUS FOR CHARACTER RECOGNITION

This invention relates to systems and apparatus for effecting recognition of characters, such as arabic letters and numerals, and is more particularly concerned with arrangements of the general kind as described in U.K. Pat. No. 1,040,294 and U.K. Pat. applications Nos. 15196/64 and 48171/65.

One object of this invention is the provision of a system or arrangement which is capable of effecting recognition of both handprinted and machine printed characters, the latter embracing a wide range of font styles.

Machines constructed in accordance with the above identified patent and patent applications have demonstrated the ability of a feature detecting method of analysis combined with the use of analog techniques as adequate for dealing with low quality print. Such machines all used geometric $n$-tuples for feature detection (analysis) and certain ones for recognition also since spatial arrangement of features is involved.

The geometric $n$-tuple, being a rigid set of points, cannot accommodate any significant variation in size of the geometric property it is designed to detect and cannot therefore be used in the final recognition of handprinted characters. The $n$-tuple is however still viable as a method of character analysis and is employed in the present invention.

In accordance with this invention the $n$-tuple technique is used firstly to act as a simple line structure detector which will indicate the presence of a plurality of short line segments of specific orientation within the character-containing field area under examination and secondly to indicate the position within such field area of topographical features of the character by analysis of the line segment responses thus obtained.

The topographical feature types dealt with include (1) line endings, (2) bends and corners, (3) junctions and (4) crossovers. Both the line segment and topographic feature detection operations are "local" operations (i.e., they relate only to a limited small part of a complete character) and can be made largely independent of the absolute size and limb thickness of a character.

Having thus obtained a character description as a series of spatial responses or maps by $n$-tuple transformations, this representation of the character is then recoded into the form of a "feature coordinate" list for further processing. Briefly such "feature coordinate" list contains the names of each detected feature and the X, Y coordinates of the position at which it occurs. The identity of the unknown character is then established by comparing the "feature coordinate" list so obtained for the examined character against standard feature coordinate lists representing known characters. The number of references necessary will exceed one for most character classes in order to deal with different forms of a character, e.g., open and closed top fours, crossed and uncrossed sevens and zeros, etc. Some of the less obvious variations in different samples of the same basic character, e.g., incomplete closure of loops, etc. may be detected and eliminated in the list before comparing it with standard lists.

The nature of this invention will be better understood from the following description of a number of specific embodiments, given by way of illustrative example only and with reference to the accompanying drawings wherein.

Figures 5, 6, 7:
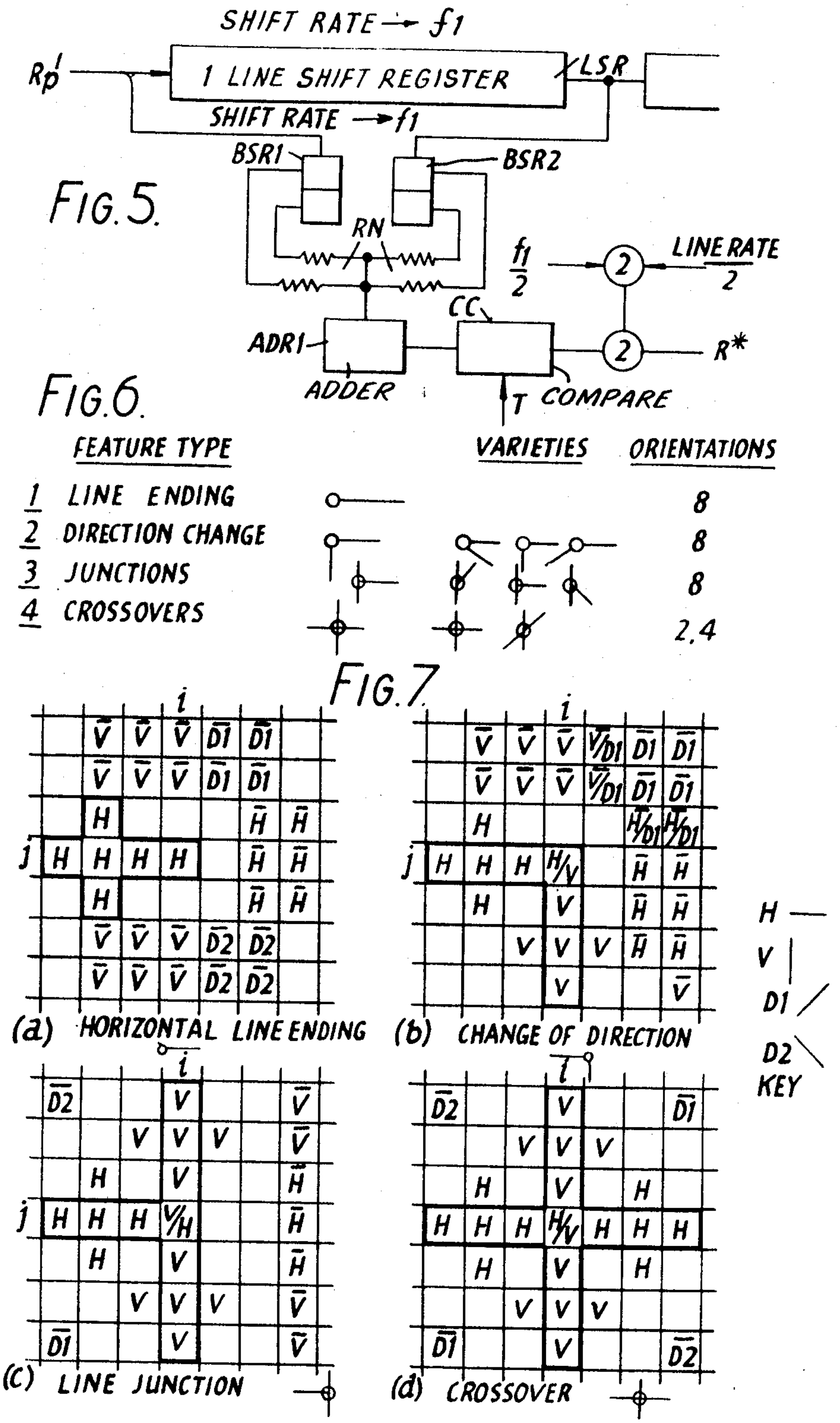
FIG. 5 is a block schematic diagram of arrangements for blurring or reducing the resolution of the response maps.

FIG. 6 comprises a group of diagrams showing the different feature types and varieties thereof.

FIG. 7 comprises a series of map diagrams (*a*), (*b*), (*c*) and (*d*) forming typical descriptions of the four feature types shown in FIG. 6.

Figures 8, 9:
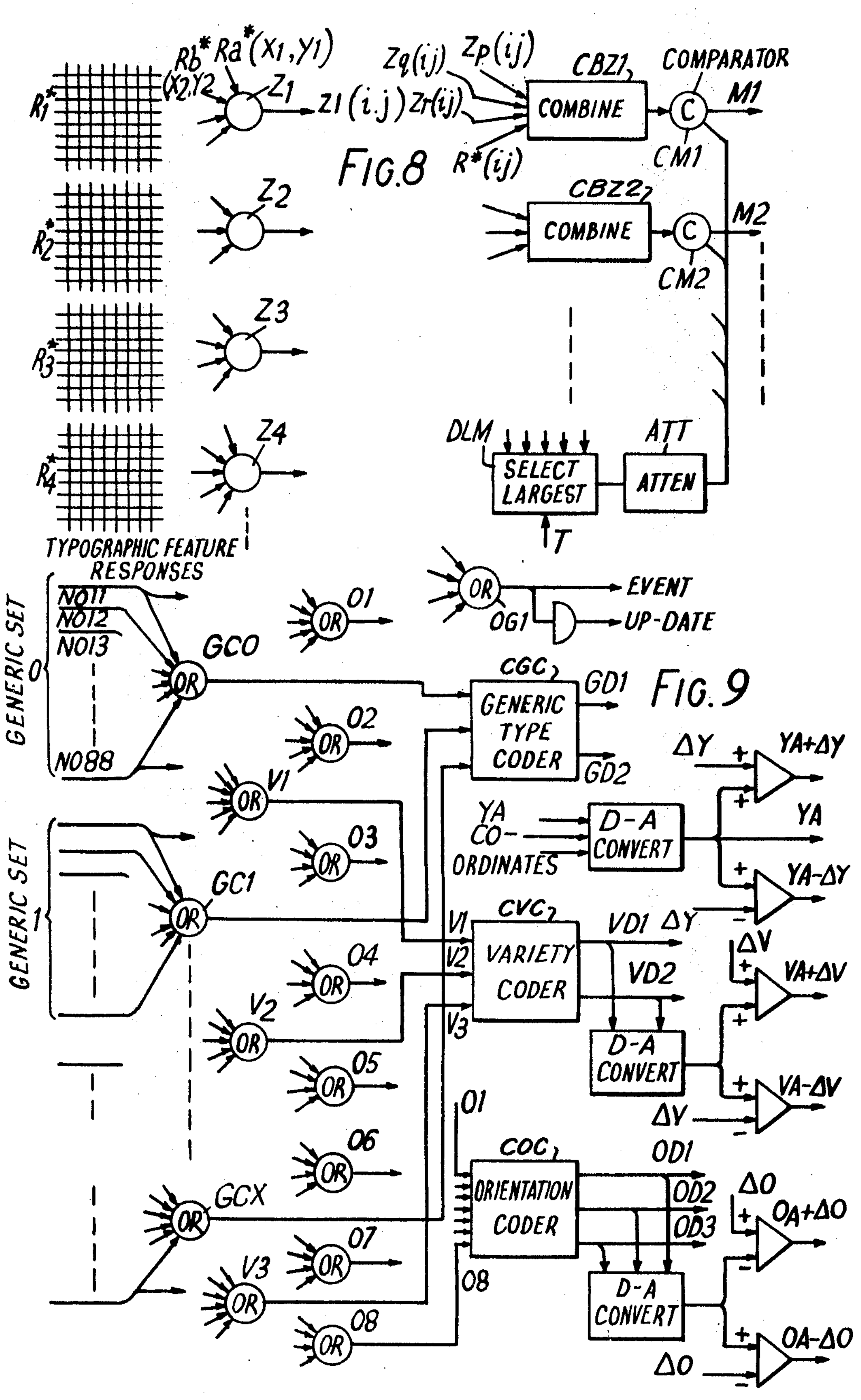

FIG. 8 is a block schematic diagram of a modified feature detecting arrangement.

FIG. 9 is a block schematic diagram showing part of the coding arrangements.

Figures 10, 11:
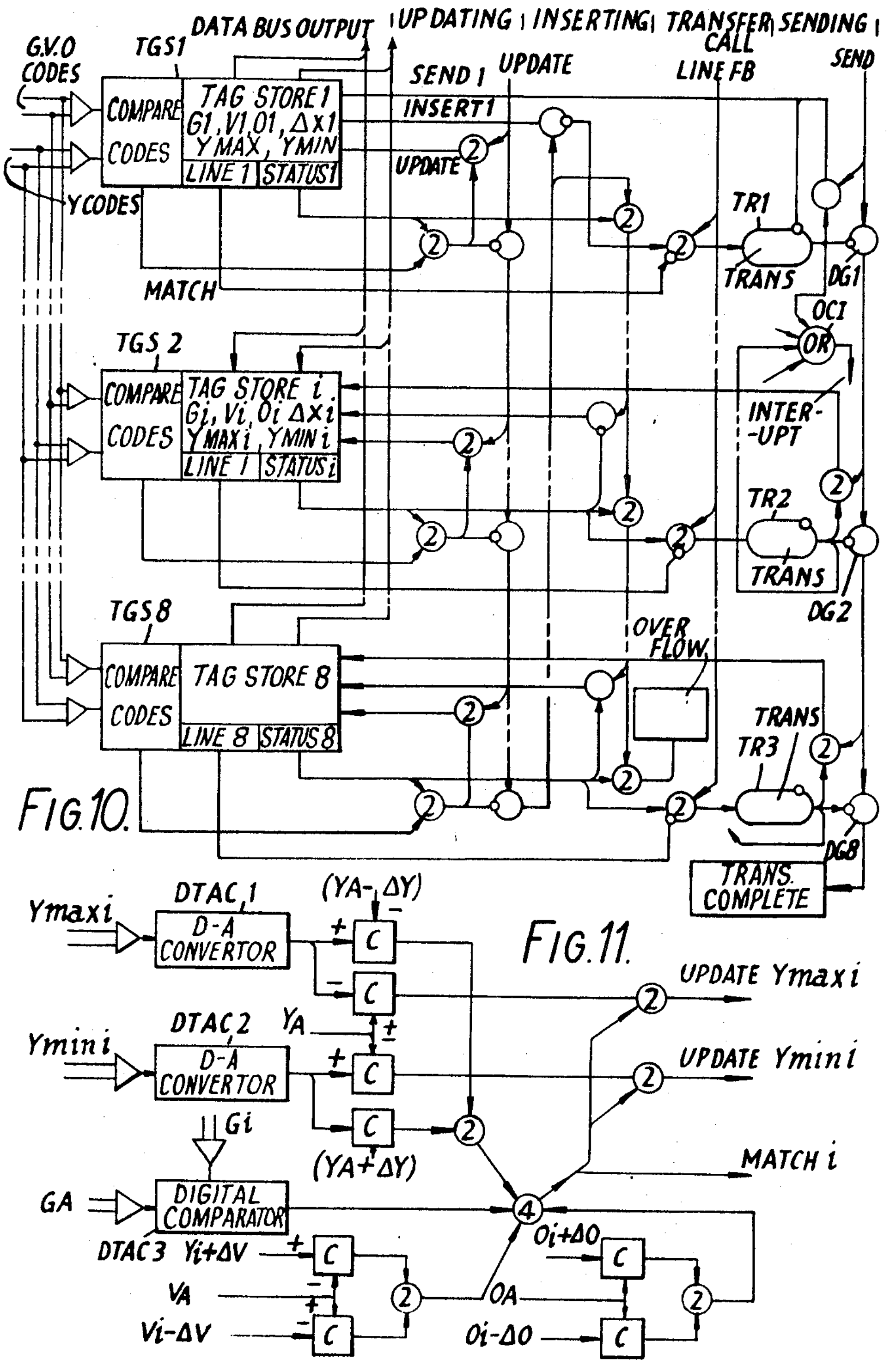

FIG. 10 is a block schematic diagram of a control logic system for storage means used in labelling and identifying different feature responses.

FIG. 11 is a logic circuit diagram showing the "compare" elements of the system of FIG. 10.

Figures 12, 14A, 14B:
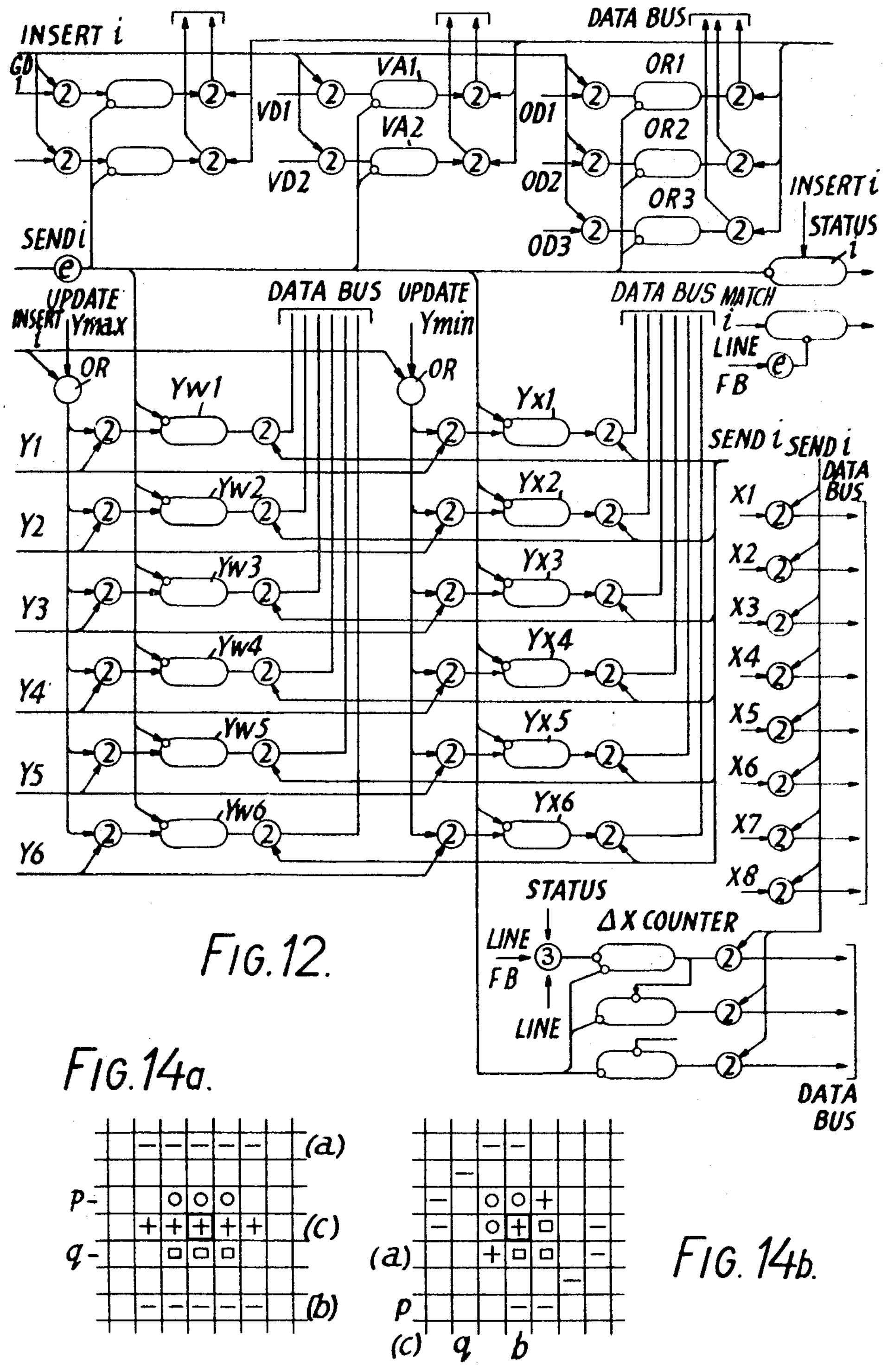

FIG. 12 is a block schematic diagram showing the form of a "tag" store of FIG. 10.

Figure 13:
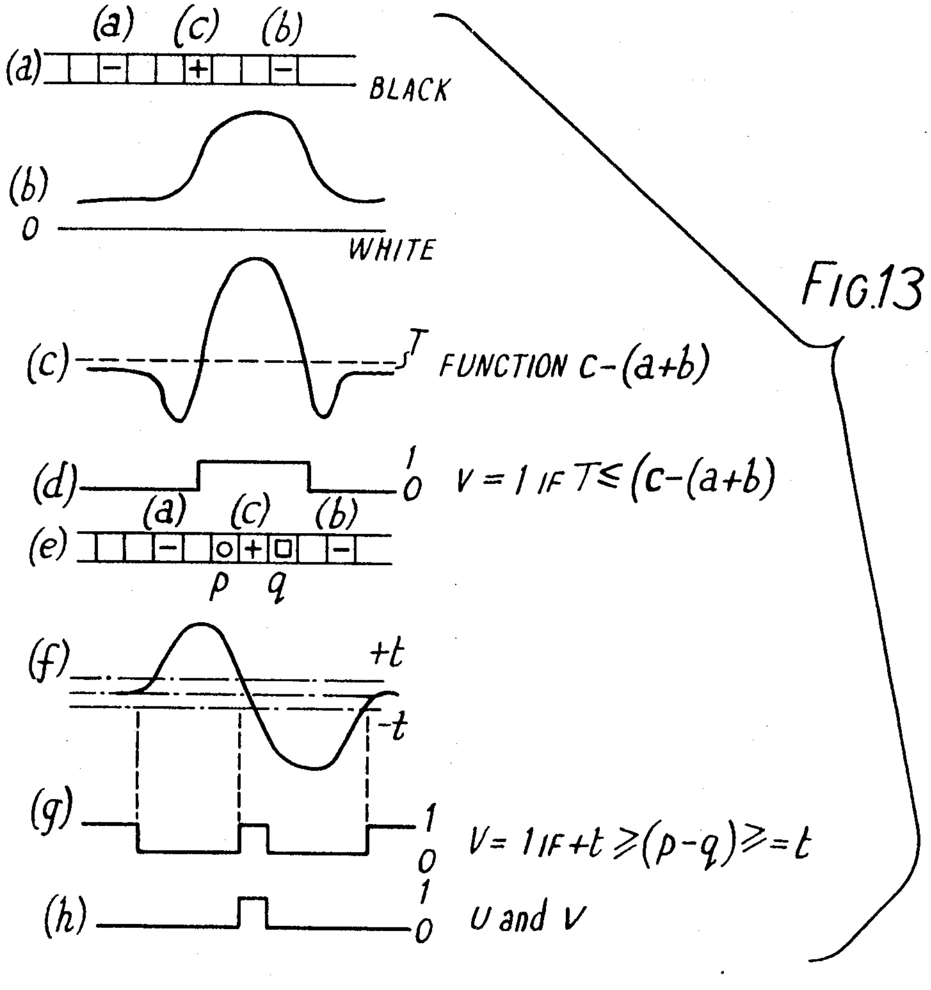

FIG. 13 comprises a series of diagrams (*a*)....(*h*) illustrating a modified line detection system.

FIGS. 14*a* and 14*b* are graphical representations of extended forms of $n$-tuple operators.

Figure 15:
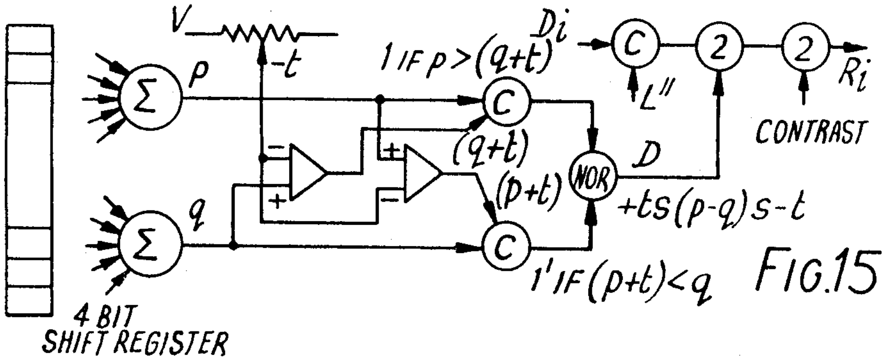

FIG. 15 is a block schematic diagram showing a system for detecting zero or zone crossing of a differential operator as shown in FIGS. 14*a* or 14*b*.

Figures 16, 17, 18:
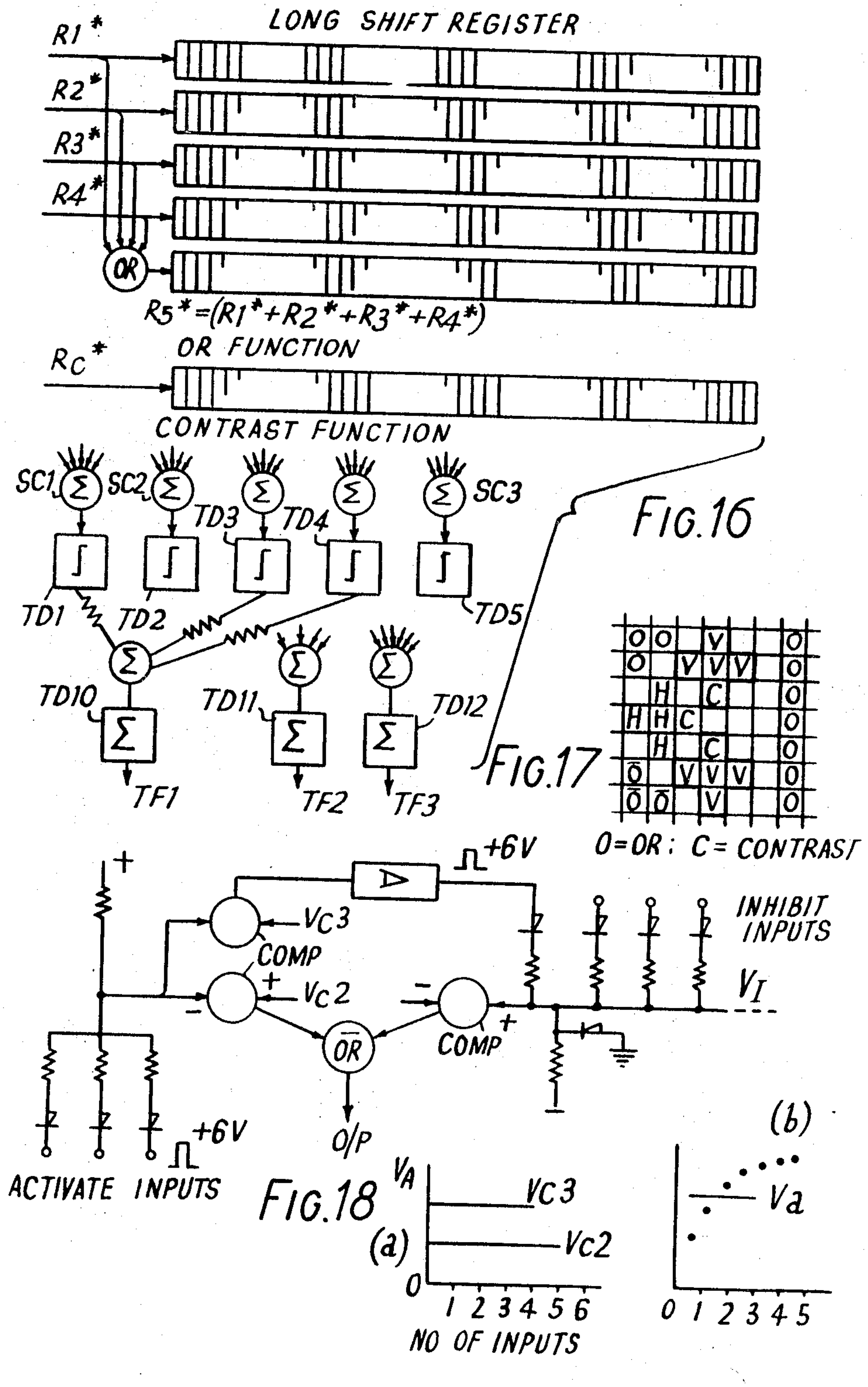

FIG. 16 is a block schematic diagram of a modified topographical feature detector system.

FIG. 17 is a graphical representation of another form of $n$-tuple operator using OR and CONTRAST functions while FIG. 18 is a simplified circuit diagram of one form of 2-zone detector.

Figures 1, 2, 3, 4:
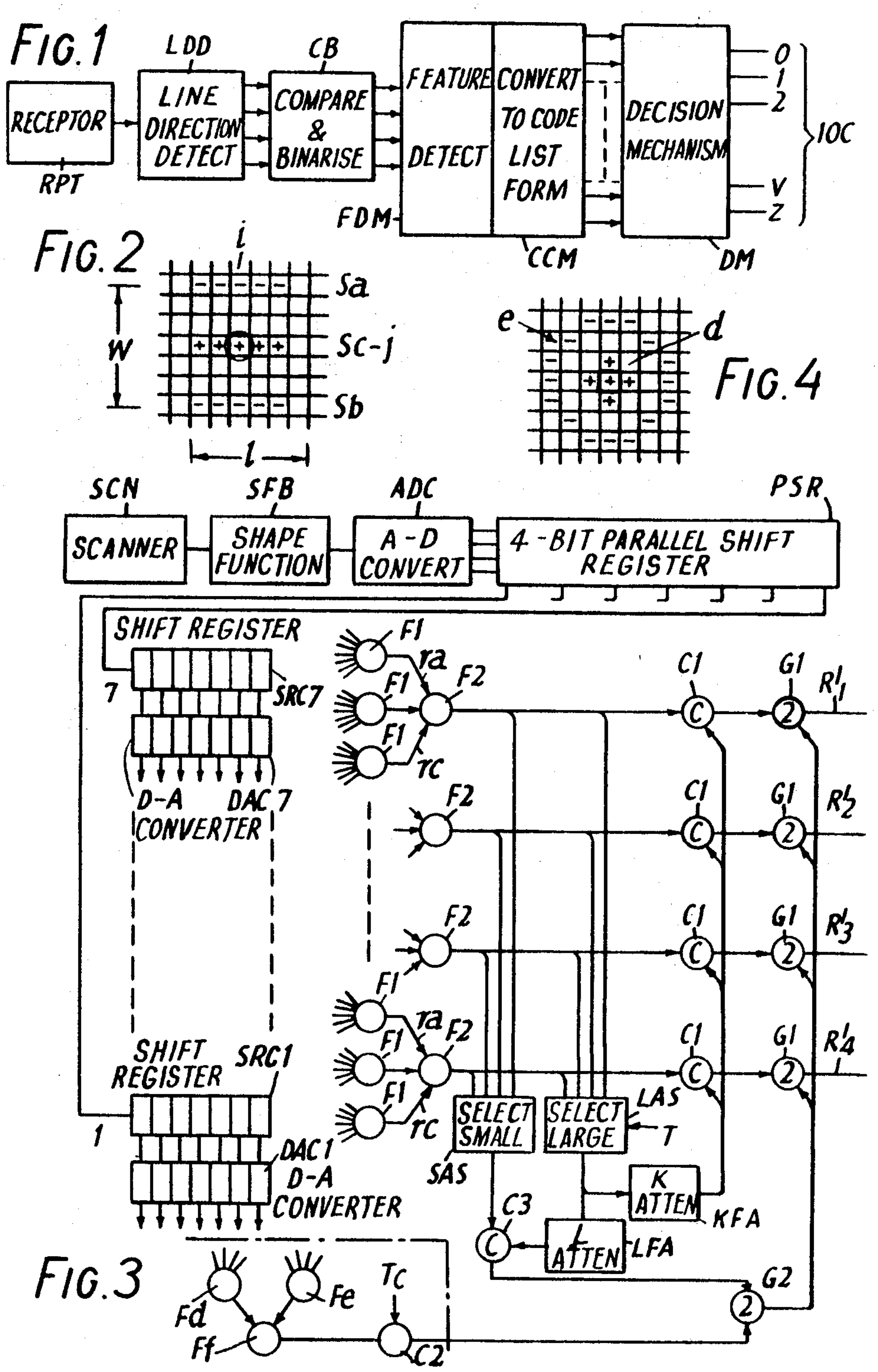
FIG. 1 is a block schematic diagram showing the basic components of the system of the invention.
FIG. 2 is a graphical representation of the geometrical form of the $n$-tuple employed in the line detection operation.
FIG. 3 is a block schematic diagram of one form of the receptor means, the first level or line direction detect means and the compare and binarize means of FIG. 1.
FIG. 4 is a graphical representation, similar to FIG. 2, of a further contrast detection operator.

Referring first to FIG. 1 of the drawings, the basic components of a system according to the invention comprise a receptor means RPT which provide an analog representation of the character to be recognized, e.g., as a variable amplitude electric signal. Such an analog representation is then fed to line direction detector means LDD and to compare and binarize means CB which operate to detect short lengths of continuous structure within the character under investigation and to reduce the original analog representation of the character as provided by the receptor means RPT to binary form. By the term "structure," as here stated, is meant a continuous, nominally straight, contrast boundary of limited length and is represented by either a continuous line or the edge of a solid area of pigment. The response of the $n$-tuples to an area of uniform density must be zero.

The presence of structure is detected by $n$-tuples of the general geometric form shown in FIG. 2 of the drawings. Four such $n$-tuples of identical form are used but with the respective orientations of horizontal, vertical and the leading and minor diagonals. The $n$-tuple is divided into three sets of points $S_a$, $S_b$, $S_c$; sets $S_a$ and $S_b$ are disposed symmetrically about the third central set $S_c$ and are "white seeking" points, the third set $S_c$ is "black seeking" and contains the reference coordinate $i, j$, for each of the four $n$-tuples as its middle point. The length $l$ of the $n$-tuple and its width $w$ are constrained to be an odd number of units. The function connecting the sampling points in each set is evaluated separately for each set, the three responses thus obtained being then combined according to another function.

As the function of the set of sampling points, multiplication or pseudomultiplication are both unduly sensitive to the granular structure of a printed image if many points are used. As the operators are seeking the apparent continuity given by a distribution of discrete marks rather than the explicit continuity of an unbroken ribbon of ink, dependence on the existence of ink at all points sampled is dangerous and an average of all the points in a set is more reliable. For this reason the sum of all the sampling points is the preferred function. Differential weighting of the individual points may be effected in order to increase the effect of the central reference cell, e.g., that at the reference position $i, j$.

The three responses $r_a$, $r_b$, $r_c$ arising from the sets $S_a$, $S_b$, $S_c$, must be combined so that the $n$-tuple has a maximum response, $R$, when straddling a character limb or when located on the edge of a solid area of ink.

The form $$R = r_c - \tfrac{1}{2}(r_a + r_b) \qquad (1)$$

gives a large response to a line but only a half-sized response to a single edge. Equal responses from a line and a single edge are given by the alternative form $$R = r_c - \min(r_a, r_b) \qquad (2)$$

The effects of the two forms depend on the subsequent processing as will be described below. The form of equation (1) will tend to bridge gaps in character limbs since lines give a larger response than edges, while the form of equation (2) will preserve all edges and lines equally. Equation (1) is usually simpler to realize in apparatus form.

The four responses $R_1$, $R_2$, $R_3$, $R_4$, from the first level direction detecting $n$-tuples are all of analog form. In order to reduce the storage requirement of an apparatus arrangement these responses are preferably reduced to binary variables. This is conveniently achieved by comparing the magnitudes of the responses $R$. If there is structure present at any point $i, j$, in the area being examined then there must be a significant difference in the set of responses $R_1$–$R_4$. For example, on an isolated vertical line the response of the vertically oriented $n$-tuple will be very much greater than the response of the horizontally oriented $n$-tuple and greater than either of the diagonal $n$-tuples. The detection of a significant difference between responses may be taken as an indication of the presence of structure and the larger responses given the binary value 1 while the remainder are given the value 0. Normally, the character limbs will not be exactly aligned with the maximum response direction of the $n$-tuples and ambiguous situations will sometimes arise (e.g., a line having an orientation of 22.5° from the vertical will give equal response in both the vertical and one of the diagonal $n$-tuples). These ambiguities cannot be resolved and the following rule is accordingly adopted.

$$R_p' = 1 \text{ if } R_p \geq K(\max(R_1, R_2, R_3, R_4)) \text{ AND } \max(R_1, R_2, R_3, R_4) \geq (\min(R_1, R_2, R_3, R_4)) \qquad (3)$$
$$= 0$$

otherwise where $R_p'$ is the binary response of a $n$-tuple $p=(1, 2, 3, 4)$; $K$ is $>0$ and $<1$ and $L$ is $>1$. Typically $K=0.8$ and $L=2$

.

Both these conditions are independent of character density and any "structure," actual or fortuitous, in the background will also be detected. To prevent this happening it is necessary to introduce a minimum threshold level which must be exceeded for any response to be recorded as binary value 1.

Thus in addition to the condition in equation (3) above $$R_p \geq T \qquad (4)$$

where $T$ is $>0$ and $<1$.

The value used in practice for $T$ depends upon the form of the function connecting the points of the $n$-tuple.

The binary form $n$-tuple responses available as the output from the compare and binarize means CB, FIG. 1, are then applied to feature detect means FDM in which such responses are analyzed to detect the presence of topographical features as defined earlier including line endings, bends and corners, line junctions and crossovers and the orientations of such detected features. The resultant series of responses representing these typographical features are then converted to a particular code list form in code-conversion means CCM, FIG. 1, for application to decision mechanism DM in which comparison of the code list for the character under examination is compared with standard code lists representing the different characters within the range capable of being detected thereby to energize a particular one of a group of identification output channels 10C.

The arrangements of one system for the scanning and first level feature detecting and binarizing operations shown in FIG. 3 comprise scanning means SCN for examining the character field area. Such scanning means may be a conventional flying spot scanner giving an output proportional to reflectance on an absolute scale, i.e., absolute black gives no output whereas 100 percent reflectance gives calibrated maximum output level. Signal sense inversion is performed in the shaping function block SFB. This block also includes means for providing any special transfer function shapes, e.g., logarithmic amplifiers, or S-curve weighting as required. Compression of signals near zero and maximum output levels is beneficial in reducing the dynamic range of the video signal to be processed and preferably reflectance levels greater than, say, 75 percent are identified with 100 percent reflectance and similarly those below, say, 30 percent with absolute black. Such methods of dynamic range compression are preferable to any automatic gain control system as they are fixed and incur no time penalty. The value of the signal from each picture element is digitized by an analog-to-digital converter ADC of four-bit capacity. The choice of four bits is a compromise between accuracy and economy.

After conversion to binary-coded form, the video signal is passed to a delay system which is completely digital and provides a limited 7-line by 8-element sampling "window" corresponding to the $n$-tuple form of FIG. 2.

The delay system is built of digital shift register stages. The digitized output of converter ADC is fed to a four-bit parallel shift register PSR. This register is divided into six serially connected sections each capable of storing a line of 48 picture elements. Such "bulk" delay shift registers are preferably fabricated using MOS large scale integrated circuit techniques and have only two terminals, namely input and output. The seven or eight adjacent picture element samples from each scan line are fed into conventional 7×4-bit shift register stages SRC1....SCR7 where they are readily accessible. As shown in FIG. 3 these accessible shift register stages are fed from appropriate points on the "bulk" delay PSR but they could, alternatively, be placed intermediately at the beginning of each section of the bulk delay thus reducing the total number of shift register stages.

To permit the use of analog computing techniques in order to evaluate the $n$-tuple responses, the four-bit values of the accessible shift register element groups are decoded using current fed ladder type of digital-to-analog converters DAC1....DAC7. The resulting analog signals are then fed to patch panels (not shown) from which the appropriately selected samples $S_a$, $S_b$, $S_c$ etc. may be taken and fed to the combining units $F_1$. The outputs $r_a$, $r_b$, $r_c$ from such combining units are then fed for final combination to combining units $F_2$ as expressed in equations (1) and (2) above. The output $R$ from each of combining units $F_2$ is the analog response to the $n$-tuple defined by $S_a$, $S_b$, $S_c$; there are four such outputs $R_1$, $R_2$, $R_3$, $R_4$ to be reduced to binary form as specified in equations (3) and (4). For convenience of evaluation by analog methods equations (3) and (4) are rearranged as $$R'_p = 1 \text{ if } R_p > K(\max(T, R_1, R_2, R_3, R_4)) \text{ AND } 1/L(\max(R_1, R_2, R_3, R_4) > \min(R_1, R_2, R_3, R_4) \text{ AND } R_p > T.$$
$$= 0 \text{ otherwise.}$$

This function is evaluated explicitly by the four comparators and 2-input AND gates C1 and G1 respectively and associated equipment of smallest amplitude selector SAS, largest amplitude selector LAS, comparator C3 and the respective $L$ and $K$ factor attenuators LFA, KFA as shown in FIG. 3.

In order to prevent operators as shown in FIG. 2 from acting outside the character boundary the threshold $T$ has to be raised to a level which will suppress outputs from the direction detectors unless at least three of the operators central zone, $c$, are "on black." In order that very dense characters shall not give rise to spurious responses the threshold level $T$ may have to be equivalent to more than two elements in zone $c$ being at peak black. Lines of lower density will then have to cover more of the elements in zone $c$ with the accompanying danger that lines of low but clearly visible density may not be detected at all.

To overcome this limitation a fifth operator as shown in FIG. 4 may be introduced. This operator detects contrast, i.e., a density difference between a central zone of approximately circular shape, $d$, and an annular surrounding zone, $e$. Both zones are of the element size as shown in FIG. 4 and use the same shift register store and further combining units F$d$ and F$e$ similar to the units $F_1$ and $F_2$ as described for the direction detectors.

The new function, $R_c$, performed by such contrast operator is given by $R_c$=1 if $1/n\Sigma$(set of $n$ points in zone $d$)$-1/m\Sigma$(set of $m$ points in annulus $e$)$\geq T_c$ =0 otherwise (5)

where $T_c$ is the chosen contrast threshold value.

This function essentially compares the mean density of the central zone, $d$, with the mean density of the annular surround, $e$. Other functions are obviously possible and can be readily implemented in hardware, such potentially useful functions include $R_c$=1 if Min (set of $n$ points in zone $d$) $-1/m\Sigma$(set of $m$ points in annulus $e$)$\geq T_c$ =0 otherwise (6)

or $R_c$=1 if Max (set of $n$ points in zone $d$) $-1/m\Sigma$(set of $m$ points in annulus $e$)$\geq T_c$ =0 otherwise (7)

The values of $T_c$ in expressions (5), (6), (7) above are likely to be different according to the forms used. For the detection of a line of minimum thickness of two elements and minimum density of 0.2 relative to mean background density then values of $T_c$ of the order of 0.15, 0.1 and 0.2 of peak signal level respectively will be appropriate to give a valid response under most conditions. The difference in effect of the three forms is, briefly, form (5) will tend to foreshorten low density narrow lines and extend thick dark lines (for both conditions the change will be approximately one element). Form (6) will tend to foreshorten all limbs and may result in the missing of very narrow limbs. Form (7) will tend to extend all lines, particularly those of high density. Form (5) is probably best under average conditions.

The (binary) output of the contrast detector C2 is used to gate the (binary) outputs from the line direction detectors so that line direction responses $R'_1$....$R'_4$ are only obtained when acceptable contrast exists. Under these circumstances the original threshold value $T$ is reduced to an arbitrary low value sufficient to prevent noise in the system being digitized to the level binary 1 by the comparators. Value $T$ is now typically set less than 0.1 of peak signal level.

After reducing the first level operator response to binary form there is some advantage to be gained, both from the respective aspects of economy and of reducing the signal to noise ratio, by reducing the resolution of the response maps. Reduction of resolution, according to the method used, can reduce the effect of noise (i.e., spurious 1 or 0 responses) in the response maps and produce a degree of positional generalization. If the spatial resolution is reduced by subjecting the maps to a defocusing or blurring operation (local averaging) the spatial quantizing can also be reduced. Experience indicates that spatial quantization can be reduced by a factor of two if the response is average over an area of at least 2×2 picture elements.

An arrangement for blurring and reducing the quantizing interval is shown in FIG. 5 and in which the binary response from the direction detecting $n$-tuples $R_p'$ is fed to a long shift register LSR storing an integral number of scan line responses in a manner similar to the first delay system. The input to the register LSR and the end of each line delay is fed to a number of individual two-bit shift register stages BSR1, BSR2. In this way a small two-dimensional section of $R_p'$ is obtained; this signal may be averaged over this area by simply summing the responses from each element in the area by the resistor network RN and adder ADR1 as shown. This average is an analog quantity which may be reduced to digital form by comparing it in comparison circuit CC against a fixed threshold value $T$. As shown in FIG. 5, the blurring is obtained over a 2×2 element area but clearly any area of, say $p\times q$ elements, could be blurred in this way. The system would be extended to have ($p-1$) long shift registers and $p\cdot q$ individual stages. $P$ and $q$ do not have to be equal, indeed experiments have indicated that blurring should be directed and related to the direction of the particular line segment detected.

Reduction in the quantizing of the blurred response by a factor 1 and $m$ is readily obtained by feeding the output of the threshold comparator to further shift register stores at every $l$'th element time in each $m$'th line scan. In order to retain all the information in a response, $l\leq p$ and $m\leq q$.

The four line segment responses, after binarizing and reduction of quantizing $R^*$, are fed to four separate shift registers. These responses are then examined to detect the presence of topographic features in the character. The feature detectors all share a common reference point so that the instantaneous responses of all feature detectors may be compared. This avoids erroneous or duplicate labelling of the same point. Analog methods of combination are used to compute the response to each feature detector, which response is then reduced to binary form after comparison with other responses. This operation is therefore similar to the original line segment detection except that there are many more types of topographic features than there are of line segments, while the $n$-tuples used are of more complicated form and take inputs from all four-line direction responses.

The types of topographic features which are detected are shown in FIG. 6. There are four generic types of features, (1) line endings, (2) changes of direction (junction of two lines), (3) line junctions (of three lines), and (4) crossovers (junctions of four lines). There are several varieties of each generic type and each may appear in a number of orientations. Eight possible orientation directions are recognized, equispaced at 45° intervals. Some of the features are identical after rotation through an integral number of 45° intervals and cannot be distinguished. The total number of useful features which can be uniquely defined in this way is 62. Not all possible features are shown but only those which have been found to be present in characters, though not necessarily in all orientations.

Typical descriptions of the various features are illustrated in diagrams ($a$), ($b$), ($c$) and ($d$) of FIG. 7. These descriptions are contained within an area 7×7 units which is equivalent to a 14×14 element area in the original character before reduction of resolution and the change in quantizing as explained above.

The detectors based on this description may clearly be zoned in a manner similar to the line segment detectors. This has the economic advantage that many of the zones will be used in more than one detector. It is also valuable from the theoretical point of view as the method of combining zones into a feature can be made nonlinear or selective in order to improve the reliability of a feature detector. A number of methods of operation are possible. For example, if zones of horizontal elements on opposite sides of a crossover detector are markedly different the feature will more likely be a junction and increased significance should be given to this feature if its response is indecisive.

A block schematic diagram of one arrangement suitable for this type of operation is shown in FIG. 8. The four line direction responses $R_1$*, $R_2$*, $R_3$*, $R_4$* are each fed to a shift register system of long and individual sections as described above in connection with the blurring apparatus (FIG. 5) which give a "window" of 7×7 elements. The zoning units Z1, Z2, Z3, Z4....are simple adders and give an analog output proportional to the number of binary 1 inputs in a zone. The area covered by an individual zoning unit is, in general, restricted to a single $R$* map, although no modification of the apparatus is necessary for individual or ORed samples to be spread over several $R$* maps. Selected zone unit outputs and additional single outputs from $R$* maps as required are combined in combining means CBZ1, CBZ2...., as by using simple linear weighted sums, to yield analog responses for each possible feature type. The largest value of these responses is detected continuously in detect means DLM and all responses from the different combining means CBZ1, CBZ2....are continuously compared in respective comparators CM1, CM2....with a large fraction of this value (determined by attenuator ATT). Any response M1, M2....exceeding this level is given the value 1. A minimum acceptable level of response is also included below which any response is assumed to be spurious and will take the value 0.

Up to this point the responses to all operations on the pattern have been two dimensional images or maps. For use in nonrigid matching schemes the representation of the character must be converted to a coded form.

The feature responses will, in general, each be roughly circular occupying from three to nine cells; the corresponding code representation takes the form of a list of feature types, their orientation and the $x$ and $y$ coordinates of the four extremes of the response area.

Individual elements in the digital responses from the feature detectors are each coded by an arrangement as shown in FIG. 9. It is assumed that only one response occurs at any element. The coding is performed in three parallel networks comprising coders CGC, CVC and COC respectively supplied with different combinations of the typographical feature responses N011, N012....through OR circuits GCO, GCl....GCX and V1, V2, V3 and 01, 02–08. These produce codes corresponding to (a) generic feature type –G, i.e., line ending, change of direction, junction, crossover, (b) feature variety within a genus –V, i.e., acute, right or obtuse angles, and (c) feature orientation –0. It is easy to arrange that the variety and orientation codes within each generic type are identical. All lines which, when active, must give the same G, V or O responses may then be simply ORed together; the outputs of these OR gates are then fed to code generators (two bits for G, two bits for V and three bits for O). For purposes of control of subsequent parts of the system, a signal called EVENT is obtained by Oring together in circuit OG1 all of the generic signals. The EVENT signal, when on, indicates that there is a response during that picture element from some feature. A delayed and reclocked version of the EVENT signal forms the UP-DATE signal also used for control purposes.

The position of the center and the size of individual feature responses can be determined by tracking the $x$ and $y$ extremes of the response. As these responses are spread over adjacent scan lines means have to be provided for "tagging" each response so that it can be differentiated from several responses to the same or different features which might occur during a single or succession of scan lines. One arrangement for performing the necessary checks and taking appropriate action is shown in FIG. 10.

There are eight "tag" stores TGS1, TGS2...TGS8 which are capable of storing the G, V, O label codes, and X, Y coordinate information relevant to the associated G, V, O codes. The coordinate information is (a)$y_{max}$, (b)$y_{min}$, (c) $x$, i.e., the number of lines in which this response has been detected. The latter, combined with the current state of the $x$ coordinate of the first line in which the response is not detected, are sufficient to give the $x$ extremes of the response. In addition each tag has two control indicators, STATUS and LINE. STATUS is set on when the tag is actually involved in tag storing; LINE is set on if the tagged response is detected during a scan line. The states of such STATUS and LINE indicators are interrogated at the completion of each scan line as explained later, this interrogation by signal LINE F.B. always leaves the LINE indicators unset.

At any instant any or all of the tag stores TGS1...TGS8 will be either free, with its STATUS indicator unset, or occupied, with its STATUS indicator set. When an event occurs the G.V.O and Y codes are compared with all of the stores tags simultaneously in a comparison unit one for each tag store (such comparison unit is shown in FIG 11 and will be explained later). If an exact or near match is detected the corresponding tag store contents are modified if necessary to record the response and the corresponding LINE indicator is set. This store modification is initiated by the signal UPDATE which, as already explained, is a delayed and reclocked version of EVENT (see FIG 9).

The tag stores are arranged in a stack, the UPDATE signal being routed to the highest matching tag store. If no acceptable match is detected the G.V.O. and Y codes are gated into the highest tag store whose STATUS indicator is unset; STATUS and LINE are then set. The management of the stacking order is performed by the several serially connected changeover gates arranged in columns in FIG. 9 and labeled updating, inserting, transfer call and sending. Update and insert gates determine the action following an EVENT.

At the end of each line scan the state of the LINE indicator for all tag stores having the STATUS indicator set is inspected. A tagging operation is completed if the LINE indicator is not set during the preceding line scan and the contents of the tag store must be output to the next stage of the system which, for convenience of description, will be assumed to be a computer. Accordingly all TRANS signals derived in the line flyback time of the scanner set triggers TR1, TR2...TR8 whose outputs are ORed together in OR gate OG1 to give an INTERRUPT signal to the computer indicating that at least one tag store is complete and ready for transfer. The transfer is initiated by a SEND signal from the computer. Gates as shown at DG1, DG2–DG8 in FIG. 10 direct the SEND signal to the highest tag store in the stack ready to transfer. Transfers will continue until all tag stores ready to transfer have done so. This is signalled by operation of the transfer complete indicator TC1 through the gates DG1, DG2...DG8.

The logic contents of the "compare" elements in FIG. 10 are shown in FIG. 11. The function performed by this unit is to give the output MATCH if there is an exact generic and acceptable $Y$, variety and orientation matches Formally, $$\text{MATCH}=1 \text{ if } (G_i=G_a) \text{ AND } (Y_a+\Delta Y) \geqslant Y_{max}) \text{ AND } (Y_a-\Delta Y)\leqslant Y_{min}) \text{ AND } (O_a-O)\leqslant O_i\leqslant (O_a+\Delta O) \text{ AND } (V_a-\Delta V)\leqslant V_i\leqslant (V_a+\Delta V)$$

$$=0 \text{ otherwise}$$

where $\Delta Y$, $\Delta 0$, $\Delta V$ are acceptable tolerances on the maximum and minimum values of $Y$, $O$ and $V$. Suffix $\alpha$ denotes the presented values from the codes.

The form of these tests is dictated by engineering convenience, the test of the generic code being performed digitally while the comparison of coordinates and orientation are preformed by analog signals, the digital codes having been converted from digit-to-analog form for this purpose by the digital-to-analog converters DTAC1, DTAC2, DTAC3.

In addition the providing the MATCH output, the comparator also indicates if the current $Y$ value should replace the stored $Y_{max}$ or $Y_{min}$ values.

The tag store formation is shown in FIG. 12. The G.V.O. codes are stored in triggers by signal INSERT, $Y$ is set into triggers $Y_{max}$, and $Y_{min}$, also by INSERT, while later values of $Y$ are set into $Y_{max}i$ or $Y_{min}i$ by UPDATE $Y$ signals as appropriate.

The triggers STATUS and LINE are set on by INSERT. While STATUS and LINE are on, LINE FB pulses are counted to indicate the $X$ extent of a response ΔX. LINE is unset by LINE FB and will be set on only if a MATCH $i$ occurs during the next line scan.

When a SEND $i$ signal occurs the state of all store triggers, ΔX counter and the current $X$ coordinate is sent as output to the DATA BUS. DATA Bus is common (i.e. paralleled) to all tag stores and is the data interface to the computer or subsequent equipment.

Experimental feature list matching activities as described below have all been by computer program.

The coded representation of an individual input pattern from the processing hardware contains "syllables" representing (a) the generic type of the feature G; (b) the variety of the basic genus V; (c) the orientation of the feature O; and its X and Y coordinates with an arbitrary origin outside the character area.

Each processed unknown character will be represented by a feature list U, containing a set of $n$ code words each containing syllables (G, V, O, X, Y) U=(G, V, O, X, Y) Similarly each of $T$ reference feature lists $R$ will contain $m$ code words, where $m$ may be different for each list $R_i$, (1=1, 2 . . . $t$)

The $T$ reference lists $R$ will all be in standard form, i.e., the X, Y ranges in each list will be constant. Before any attempt is made to compare U with any $R$, the range of XY in U must be similarly standardized. After determining the maximum and minimum X and Y coordinates in U this standardizing is done easily $$X := \frac{P(X - X_{min})}{X_{max} - X_{min}}$$

$$Y := \frac{Q(Y - X_{min})}{Y_{max} - Y_{min}}$$

where P×Q is the required standard size.

The first step in the comparison is to search through $T$ until a reference list $R_i$ is found in which the number of words $m$ is approximately equal to $n$.

$$n + \Delta n \geq m_i \geq n - \Delta n$$

where $\Delta n$ is the tolerance and is determined empirically.

Upon finding a tolerable match of $m$ and $n$ the comparison operation tests to see if the number of each feature type in U is roughly equal to the number of corresponding feature types in $R_i$. This test is obviously similar to the test on $m_i$ but with limits of ΔF.

These two tests are simple being merely comparison of counts and have been found to cut down the number of detailed comparisons which are required by a large factor. The test effectiveness can be increased if the tolerance allowed is different for the several feature types; for example, the number of changes of direction is much more variable than, say, the number of line endings or intersections. The tolerance of both the overall number of feature tests and the number of individual feature tests may also be related to the individual reference characters being tested.

After these preliminary tests the remaining $R$ lists must be examined in more detail. The first word in the U list is compared with succeeding words in the first remaining $R$. When an exact G match is obtained, the degree of V match is tested and if this is within acceptable limits, the 0 match is then tested. If the 0 match is acceptable the difference in the X, Y coordinates are determined. As soon as the G, V or O match is found unacceptable the search for a matching word moves to the next word in the $R$ list. If the match is accepted the X, Y errors are stored and the tests continued on the next word in the $R$ list. If another G, V, 0 match is found the smallest X, Y error is stored.

At the completion of the comparison with each word in the $R$ list, succeeding words in the U list are similarly tested and the root mean square X, Y error is accumulated.

If a word in the U list fails to find an acceptable G, V, O match or when all the U list words have been accounted for the tests pass to the next $R$ list and the total X, Y error for the current list stored. If any word fails to find a match in $R$ the corresponding reference is removed from further consideration.

At the completion of the search through all the $R$ lists surviving the preliminary tests the total X, Y errors for each acceptable $R$ list are compared and the smallest error detected; the corresponding $R_i$ then identifies the most probable character class. This classification is accepted if the error is reasonably small and the ratio between the two smallest errors, one in the most probable and one in another character class, is greater than a stated factor. The optimum size of these two acceptance margins is determined by experience.

In order to reduce the number of $R$ lists necessary to represent all the variation in characters which may occur due to nonclosure of loops, crossing junctions etc. it may be necessary to process the U list to eliminate such effects. Failure to neatly close a loop or form junctions etc. will produce two or more feature labels which are very close together. Such close groups will be characteristic of the intended feature and can be removed from the U list and replaced by the appropriate single feature code and the relevant X, Y coordinate.

Many modifications may be made without departing from the scope of the invention.

One modification of line direction detection comprises a method for reducing the effect of variation in character limb widths in the processed character. The principle of operation is illustrated in FIG. 13 with reference to a character limb cross section, i.e., a one-dimensional pattern. In one dimensional form the line direction operator reduces to a second order finite difference device as illustrated in diagram ($a$) FIG. 13. If this operator is applied to a limb cross section whose density is plotted in diagram ($b$) FIG. 13$i$, the conventional "chad" response as shown in diagram ($c$) FIG. 13 is obtained. If this is binarized slightly above the zero line it gives a binary signal as shown in diagram ($d$) FIG. 13 and has a width closely related to the limb cross section width, diagram ($b$), at the "-half height" points. This is the situation which exists in the system so far described. If a second operator embedded in the first is introduced, as shown in diagram ($e$), FIG. 13, by the added circular and square symbols, $p$ and $q$, and is applied to the limb cross section the familiar S-curve response of diagram ($f$), FIG. 13 is obtained. This is, in effect, the first order finite differential of the density curve of diagram ($b$) and by applying small positive and negative thresholds to this function by binary signal of diagram ($g$), FIG. 13 is obtained (equivalent to zero crossing of the first differential). If this signal is gated with the binary response from the operator shown in diagram ($a$) the response as shown in diagram ($h$) FIG. 13 results. It will be seen that this narrow pulse response corresponds accurately to the peak density of the character limb cross section. This is the point commonly taken to indicate the character centerline. The width of the response is now a function of the rate of change of density at maximum density of the character rather than the "half height" method used previously. The effect is to reduce the variation in limb response width and thus obtain a more nearly standard signal for subsequent processing. As this additional operator is associated with a particular line direction there are four of them each sharing the same base coordinate as its corresponding line direction detector. An apparatus arrangement and generalization of the modified operator to two dimensional form is shown in FIGS. 14$a$, 14$b$ and 15. FIG. 14$a$ shows one configuration of the operator incorporating the additional sets of points $p$ and $q$. The form shown is probably the most obvious and one variation which has been found to be somewhat more useful has the same layout of points but the zones $p$ and $q$ both include the central points of the zone ($c$). This arrangement produces a less noisy differential function (defined below) and also is more reliable in use on thin limbed characters. FIG. 14($b$) shows the configuration of this modification for one direction only—it is repeated for all four directions.

The response of the additional operator $p{\cdot}q$ can be stated formally as $$V = 1 \text{ if } -t \leq (\Sigma p - \Sigma q)\ s + t$$
$$= 0 \text{ otherwise}$$

Detailed circuit diagrams of the various blocks in the various diagrams have not been described as their implementation in terms of electronic apparatus is obvious to those skilled in the art.

The previously described operators $F_1$ and $F_2$ have been indicated as mean signal level computing devices, or maximum or minimum seeking devices; where apparatus is involved such operators may be computed by means of a low impedance star network of resistors with each separate input connected to a limb of the star. The midpoint of the star is fed to a high input impedance buffer amplifier. Such an arrangement has the advantage that the potential at the midpoint of the star is equal to the mean potential of the inputs connected thereto. The maximum and minimum detectors simply employ a group of diodes, one to each input in the desired sense. The signal level employed is of the order of 4v. peak so that offset variations from diode to diode (or when more than one diode is following the max. or min. signal) is negligible.

One alternative method for the design of topographic features detectors as described earlier resides in the use of the logical OR of all direction detectors as the NOT elements surrounding, and also for some of the alternatives permitted in, the main structure seeking zones of the operator. This has the effect of eliminating the previous requirement for taking logical combinations of specified direction at some points in the operator, particularly the central zone of the operator which now also uses the OR of all directions rather than of specific combination. This produces rather more general operators and also a simpler apparatus requirement as the logical OR of directions is readily made available as a fifth possible input to the operators, see FIG. 16.

It may also be desirable to use the CONTRAST function as a sixth type of input in the operator under some circumstances. This function is particularly useful in the complex operators such as junction and crossover detectors in which the direction detector outputs at the "node" of the feature are often missing due to the complexity of the structure at that point and also in many instances the excessive thickness of character lines at points of intersection, etc. The contrast function, because of its nonspecific shape, will penetrate much further into line junction etc. than the specific line direction detectors and can be used as "connective structure" in the central zones of topographic operators. It should never be used in the main limbs of features away from the "node" nor as the NOT part of the feature operator surrounding the structure seeking parts. This is because the contrast detector can be triggered by spurious noise in the image which does not conform to the requirement for continuity of structure implied by the direction detection described and is therefore unreliable in its responses in critical conditions. For this reason the contrast function when used in the topographic feature detector is only used as low grade connective information.

Though having a better penetration than the specific direction detectors, the contrast function also has a zero response on extensive areas of uniform density, thus the central area of a crossover of two excessively thick lines will not necessarily produce a contrast signal at all. It is, therefore, common in topographic feature detectors to omit entirely the vulnerable central element or elements of FIG. 17.

The arrangement for topographic feature detection shown in FIG. 16 is somewhat different from the previously described method of obtaining responses. The previous system is a completely linear one in which the zone outputs and the zone combination outputs are all analog signals, judgement on the most probably response being based upon the relative magnitudes of the several responses. The alternative form shown in FIG. 16 has advantage in greater flexibility and in the options it provides for controlling the degree of mismatch which will be tolerated.

As before the operator is split into two parts; the first concerned with a zone operation within a compact area, generally for a single direction, the second forming a combination of spatially related zones to define the complete operator (and hence the feature being sought). The modified form applies thresholds to the outputs of both the first and second parts of the operator thus producing a digit (binary) signal at the output of each. The purpose of the threshold is to produce a binary output indicating that a certain level, represented by the threshold, of activity either does or does not exist in each zone and/or in the combined output from a number of zones.

For certain features it has been found useful to divide the operator into only two zones, an "inner" activate zone and an "outer" inhibit zone each with its own threshold. With this simple situation it is possible and usually desirable to discard the generality of the zoning approach for the concentration of an operator which is highly "tailored" for its specific purpose. This is particularly true for line ending and change of direction detectors where satisfactory performance has been obtained with simple two-zone detectors.

A circuit for implementing the two-zone operator is shown in FIG. 18. This operates in a manner by which the number of events occuring in one zone modifies the conditions necessary to exceed the threshold in the other. In the detailed circuit shown the absence of a required input in either zone makes mandatory input to all inputs in the other zone. The exact threshold conditions obtained in practice are determined by the components as marked in FIG. 18.

We claim:

1. Apparatus for effecting recognition of handwritten and machine printed characters in which a geometric $n$-tuple technique is utilized, said system comprising:

first line structure detector means for indicating the presence of a plurality of short line segments of specific orientation within a field area containing the character under examination by combining signals representing a plurality of geometric $n$-tuples having specific geometric orientations with respect to said field area, and second means for indicating the position within such field area of topographical features of the examined character by analysis of the line segment responses thus obtained from said first means.

2. Apparatus according to claim 1 in which said first means includes means for defining a plurality of geometric $n$-tuples of identical form but with different orientations to detect the presence of line structure.

3. Apparatus in accordance with claim 2 in which said means for defining comprises means for providing four identical geometric $n$-tuples with respective orientations of horizontal, vertical, leading diagonal and minor diagonal.

4. Apparatus in accordance with claim 2 in which each of said geometric $n$-tuples comprises three linear sets of spaced points with two outer sets disposed symmetrically on opposite sides of the third.

5. Apparatus in accordance with claim 4 in which the two outer sets of points are operative to seek field background or "white" whereas the central or third set of points is operative to seek character image or "black."

6. Apparatus in accordance with claim 1 including means for analyzing said line segment responses to detect topographical features comprising line endings.

7. Apparatus in accordance with claim 1 including means for analyzing said line segment responses to detect topographic features comprising bends and corners.

8. Apparatus in accordance with claim 1 including means for analyzing said line segment responses to detect topographical features comprising line junctions.

9. Apparatus in accordance with claim 1 including means for analyzing said line segment responses to detect topographical features comprising line crossovers.

10. Apparatus in accordance with claim 6 including means for defining a fifth operator for detecting contrast between a first zone and a surrounding annular zone for use in addition to the aforesaid $n$-tuples in detecting line structure.

11. Apparatus according to claim 1 including means for converting each of the topographic feature responses obtained during examination of any character to a code signal indicative of its generic feature type, its feature variety within the particular genus type and its orientation.

12. Apparatus according to claim 11 in which said means for converting also supplies an indication of the position of the feature within the scanned field area in said code signal.

13. Apparatus according to claim 11 including means for matching a group of code signals derived from examination of a character against lists of similar code signals previously obtained from corresponding examination of ranges of standard characters to establish identity or near-identity therewith.

14. Apparatus in accordance with claim 1 further including means for photoelectrically examining the field area containing the character to be recognized by movement of an examination apot along a predetermined scan path.

15. Apparatus in accordance with claim 14 including means for connecting an analog form signal waveform from said means for the photoelectrically examining to multiple-digit binary form and for applying such binary form signal to a corresponding multiple-bit parallel shift register operating as a tapped delay device from which differently delayed signal versions are taken for the formation of said $n$-tuples.

16. A method for generating a feature-coordinate table derived from an input character image which is later compared with similar tables derived from known images to identify said input image, said method comprising the steps of:

generating a plurality of $n$-tuple output signals corresponding to a like plurality of geometrical $n$-tuples specifically oriented and positioned with respect to a field area containing a character image under examination to indicate the presence of short line segments of specific orientation with the field, combining said ntuple output signals according to a predetermined formula to produce signals providing the identity and position of specific topographical features of the examined character thus providing the necessary information for entries in said feature-coordinate table.

17. A method as in claim 16 wherein said plurality of geometrical *n*-tuples are chosen to be of identical form but to have different relative orientations.

18. A method as in claim 17 wherein each of said geometrical *n*-tuples is chosen to comprise three linear sets of spaced points with two outer sets disposed symmetrically on opposite sides of the third set.

19. A method as in claim 18 wherein said relative orientations are selected to correspond to vertical, horizontal and two mutually orthogonal diagonal directions.

20. A method as in claim 18 wherein:

said two outer sets of points are caused to seek field background or "white," and said third set of points is caused to seek character image or "black."